United States Patent [19]

Kato et al.

[11] Patent Number: 5,059,576

[45] Date of Patent: Oct. 22, 1991

[54] CATALYST FOR REMOVING NITROGEN OXIDES AND A PROCESS FOR PRODUCING THE SAME

[75] Inventors: Yasuyoshi Kato; Fumito Nakajima; Ikuhisa Hamada; Masahiro Nitta; Kunihiko Konishi; Toshiaki Matsuda; Naomi Yoshida, all of Kure; Nobuyoshi Ishida, Hiroshima; Hitoshi Yamasaki, Kure, all of Japan

[73] Assignee: Babcock-Hitachi Kabushiki Kaisha, Tokyo, Japan

[21] Appl. No.: 565,211

[22] Filed: Aug. 8, 1990

Related U.S. Application Data

[63] Continuation of Ser. No. 453,690, Dec. 20, 1989, abandoned.

[30] Foreign Application Priority Data

Dec. 21, 1988 [JP] Japan ................................. 63-324676
Jan. 25, 1989 [JP] Japan ................................. 1-15930
Mar. 2, 1989 [JP] Japan ................................. 1-50742

[51] Int. Cl.$^5$ .................... B01J 21/06; B01J 23/22; B01J 23/28; B01J 23/30
[52] U.S. Cl. .................... 502/309; 502/350; 502/527
[58] Field of Search .................... 502/309, 350, 527

[56] References Cited

U.S. PATENT DOCUMENTS

| | | | |
|---|---|---|---|
| 4,280,926 | 7/1981 | Abe et al. | 252/430 |
| 4,293,447 | 10/1981 | Inaba et al. | 252/461 |
| 4,416,800 | 11/1983 | Abe et al. | 502/159 |
| 4,695,559 | 9/1987 | Wagener et al. | 502/183 |
| 4,851,381 | 7/1989 | Hums | 502/209 |

FOREIGN PATENT DOCUMENTS

0191918  8/1986  European Pat. Off. .
3433197  3/1985  Fed. Rep. of Germany .

OTHER PUBLICATIONS

Chemical Abstracts, vol. 109, 1988, p. 331, Abstract No. 78601k, Columbus, Ohio, U.S.

*Primary Examiner*—W. J. Shine
*Attorney, Agent, or Firm*—Fay, Sharpe, Beall, Fagan, Minnich & McKee

[57] ABSTRACT

A catalyst or a catalyst structure for removing nitrogen oxides contained in exhaust gases, having a small pressure loss and hard to cause ash deposition, and a process for producing the same are provided, which catalyst comprises a mixture of a catalyst composition of titanium oxide and at least one member of oxides of vanadium, molybdenum and tungsten, and inorganic fibers, the clearances of the inorganic fibers are filled with said catalyst composition; the ration by weight of said catalyst composition to said inorganic fibers is 3 or more; and the apparent density of said catalyst is 0.8 g/cm$^3$ or more; and which process comprises providing a composition containing titanium oxide and at least one member of oxides of vanadium, molybdenum and tungsten, calcining said composition at 500°–650° C., crushing the calcined material so that powder of 20$\mu$ or less can occupy 90% by weight or more of the crushed material, adding water to the crushed material to form a slurry, impregnating an inorganic fiber sheet with the above slurry, placing the resulting sheet between porous molds, drying and molding it, and clacining the resulting molded material at 300°–650° C.

10 Claims, 7 Drawing Sheets

CATALYST FOR REMOVING NITROGEN OXIDES AND A PROCESS FOR PRODUCING THE SAME

This is a continuation of copending application Ser. No. 07/453,690 filed on Dec. 20, 1989, now abandoned.

BACKGROUND OF THE INVENTION

1. Field of the Invention

This invention relates to a catalyst for removing nitrogen oxides and a process for producing the same. More particularly it relates to a catalyst for removing nitrogen oxides having a high strength and suitable for a molded member of a large-sized catalyst structure.

2. Description of the Related Art

As a catalyst for removing nitrogen oxides (hereinafter abbreviated to denitration catalyst), that obtained by molding a catalyst composition comprising titanium oxide ($TiO_2$) and at least one of oxide of molybdenum (Mo), tungsten (W), vanadium (V), etc. into granular form, plate form, honeycomb form or the like have generally been used. In the case of treating exhaust gas from a boiler furnace in which a fuel such as heavy oil, coal, etc. is burnt, since the gas contains a large quantity of soot and ashes, the denitration catalyst to be contacted with the exhaust gas is desired to have a low pressure loss and hardly deposit such soot and ashes. From this point of view, a catalyst assembly of plate-type catalyst, a honeycombform catalyst having a high percentage opening, etc. have been used. These catalysts have flow paths of the gas formed in parallel to the flow direction of the gass.

As such catalysts, a number of catalysts such as a catalyst obtained by coating a metal plate substrate with a catalyst component (Japanese patent publication No. Sho 61-28377/1986), a catalyst obtained by extrusion-molding a catalyst component into a honeycomb form (Japanese patent publication No. Sho 60-3856/1985), a catalyst obtained by molding a ceramic fiber mat or paper into a honeycomb form, and coating the resulting material with a catalyst precursor (Japanese patent publication No. Sho 58-11253/1983), etc. have been known and practically used.

Among the above prior art, the catalyst obtained by coating a metal plate with a catalyst component is superior in that the flat portion of the catalyst is so large that the pressure loss becomes small; hence ashes are hardly deposited, but there have been raised drawbacks that the resulting catalyst is heavy and the metal plate is liable to be oxidized.

Further, in the case of a catalyst obtained by molding a catalyst component into a honeycomb form according to extrusion-molding process, the resulting product is restricted to a dimension of about 150mm square or less due to a limit of the molding technique. Hence, in order to pack such a catalyst product in a denitration apparatus having a large capacity such as several hundreds $m^3$, it has been necessary to use a large number of such catalysts. Further, the molded product has a low impact strength. Moreover, the catalyst obtained by coating the surface of the ceramic fiber mat or sheet with a catalyst component has a drawback that its mechanical strength is so low that the catalyst is abraded by ash particles contained in exhaust gases.

SUMMARY OF THE INVENTION

The object of the present invention is to provide a catalyst having overcome the above problems of the prior art and having an enough strength for a large-sized catalyst structure suitable to a large capacity denitration apparatus.

The present invention has the following specific features:

(1) A catalyst for removing nitrogen oxides comprising a catalyst composition containing titanium oxide and at least one member of oxides of vanadium, molybdenum and tungsten, and inorganic fibers, wherein the clearances of the inorganic fibers are filled with the catalyst composition; the ratio by weight of the catalyst composition to the inorganic fibers is 3 or more; and the apparent density of the catalyst is $0.8 g/cm^3$ or more.

(2) A process for producing a catalyst for removing nitrogen oxides, which comprises providing a composition containing titanium oxide and at least one member of oxides of vanadium, molybdenum and tungsten, calcining said composition at 500–650° C., crushing the calcined material so that powder of $20\mu$ or less can occupy 90% by weight or more of the crushed material, adding water to the crushed material to form a slurry, impregnating an inorganic fiber sheet with said slurry, placing the resulting sheet between porous molds, drying and molding it, and calcining the resulting molded material at 300–650° C. to obtain a molded catalyst.

(3) A process for producing a catalyst assembly for removing nitrogen oxides, which comprises providing a composition containing titanium oxide and at least one member of oxides of vanadium, molybdenum and tungsten, calcining said composition at 500–650° C., crushing the calcined material so that powder of $20\mu$ or less can occupy 90% by weight or more of the crushed material, adding water to the crushed material to form a catalyst slurry, impregnating an inorganic fiber sheet with said slurry, placing said impregnated sheet between porous molds, drying and molding it, calcining the resulting molded material at 300–650° C. to obtain a molded catalyst, piling said molded catalyst and an inorganic fiber sheet impregnated with a catalyst slurry prepared in the same manner as the above, alternately, drying and calcining to form a catalyst assembly.

According to third feature of the present invention, an inorganic fiber cloth is piled on said inorganic fiber sheet impregnated with a catalyst slurry containing calcined catalyst particles, alternately, followed by drying and calcining the resulting material, to obtain a catalyst consisting of an inorganic fiber cloth integrated with an inorganic fiber sheet.

Further, according to fourth feature of the present invention, an inorganic fiber cloth is coated on one surface or both the surfaces thereof and down to its inside, with a catalyst slurry or a paste containing inorganic fibers, followed by drying and calcining the resulting material, to obtain a catalyst consisting of a inorganic fiber cloth coated with inorganic fibers having the clearances between the fibers filled by catalyst component particles.

In the case of the former feature, as compared with a mere inorganic fiber sheet impregnated with the catalyst slurry, the strength of the cloth itself and the reinforcement brought by embedding the fine particles of the catalyst component in the clearances between fibers constituting the cloth, are combined with the structures of the cloth and the sheet to form a texture of a very high strength. As to the structure, by shifting the threads directions of the respective cloths constituting the catalyst, it is possible to exhibit a high strength against a multi-axial stress. Further, by impregnating again the catalyst after molded and dried, with the catalyst slurry, the catalyst intrudes into vacant parts formed after water vaporizing due to drying, to improve the density and strength of the catalyst.

Further, as to the above-mentioned latter feature, the inorganic fiber cloth reinforces the catalyst layer containing inorganic fibers, as if the inorganic fiber cloth might function like wire.

DETAILED DESCRIPTION OF PREFERRED EMBODIMENTS

As described in the above items (1) and (2), when an inorganic fiber sheet is impregnated with a slurry containing catalyst component calcined in advance, in the above-mentioned proportion, followed by drying and calcination, then the clearances between the fibers of the sheet are completely filled with the oxide particles of the catalyst components to form an extremely dense catalyst body. In this catalyst, inorganic fibers are interlaced or entangled with each other to contribute to reinforcing the catalyst component layers.

The strength of the resulting catalyst body is higher than those of a product obtained by coating the surface of an inorganic fiber sheet with mere uncalcined catalyst components, or a product obtained by impregnating the inorganic fiber sheet with catalyst components solution.

Further, according to the present invention, by employing a process of impregnating an inorganic fiber sheet with a catalyst component slurry, followed by placing the resulting sheet between porous molds, pressing if necessary, and drying it, the sheet is imparted a definite form by the molds, and converted into an objecting molded catalyst having a high density and a high strength.

Thus, it is possible to easily obtain a catalyst body having an optional form and a large size. Further, it is possible to produce a catalyst assembly having a low pressure drop and a small quantity of deposited ashes, using the above catalyst bodies by simple steps.

Figure 6:
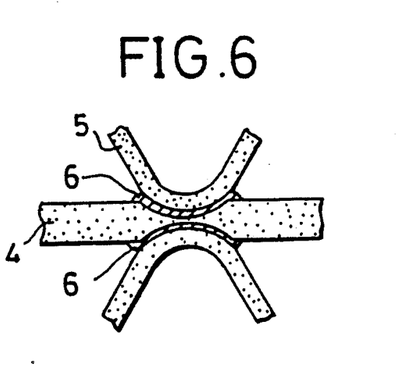
FIG. 6 shows a view illustrating the principle of formation of the integrated catalyst structure in the process of the present invention.

Further, according to the above-mentioned process (3), as shown in FIG. 6, since an inorganic fiber sheet 4 impregnated with a catalyst component slurry has plasticity, deformation as shown in the figure occurs at the contact part of the catalyst body 5 molded in advance. At the same time, slurry 6 contained in the sheet is extruded from the inside of the sheet 4, and water contained in the slurry is absorbed by catalyst body 5 molded in advance; hence the slurry 6 rapidly solidifies and plays a role of an adhesive. Thus, it is not only possible to form an integrated structure of the catalyst bodies without using any particular adhesive, but also since there is formed a state where the contact part of the molded catalyst body 5 is embedded into the part of the slurry-containing sheet 4, it is possible to realize an integrated catalyst structure having a high strength.

Further, as compared with the case where the inorganic fiber sheet is directly subjected to corrugation processing, since the material subjected to corrugation processing has a high strength itself, it is possible to easily produce an integrated catalyst or a catalyst assembly having flow paths having a large diameter.

Figure 7:
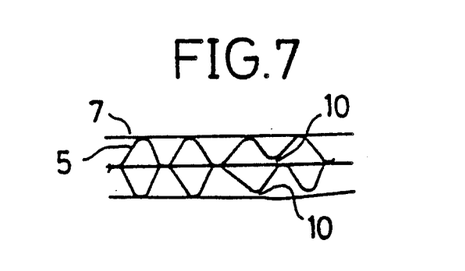
FIG. 7 shows a view illustrating a problem on piled sheet form catalysts.
Figure 8A:
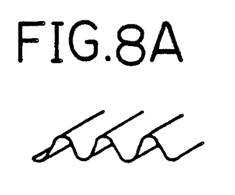
FIG. 8A, FIG. 8B, FIG. 8C, FIG. 8D, FIG. 8E and FIG. 8F each show a view illustrating a molded catalyst form of the present invention.
Figure 8B:
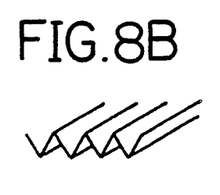
Figure 8C:
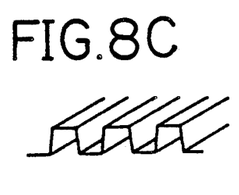
Figure 8D:
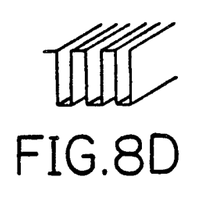
Figure 8E:
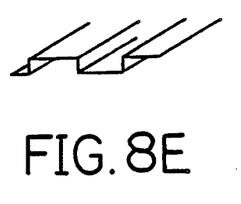
Figure 8F:
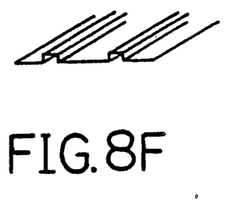

Further, in the conventional case where an already molded sheet reinforced with a mineral binder and processed into corrugation form, and a flat sheet are alternately piled, since the both have stiffness, there occur, as shown in FIG. 7, a number of parts 10 where the contact points of the flat sheet 7 and the corrugated sheet 5 are separated whereas according to the process of the present invention, such separation does not occur and an integrated catalyst having a firm structure can be easily obtained.

The constitution of the catalyst of the present invention and the process for producing the catalyst will be described in more detail.

Figure 1A:
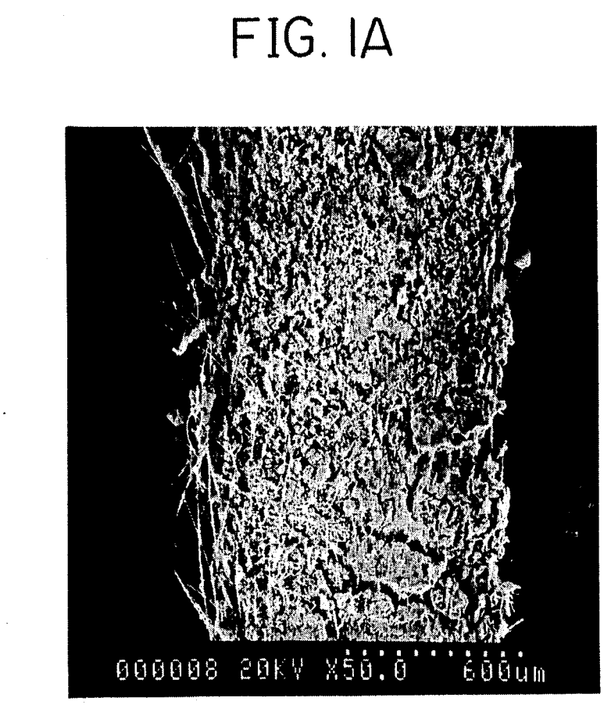
FIG. 1A shows a cross-section of a catalyst obtained according to an example of the present invention, as viewed with its microscopic photograph.
Figure 1B:
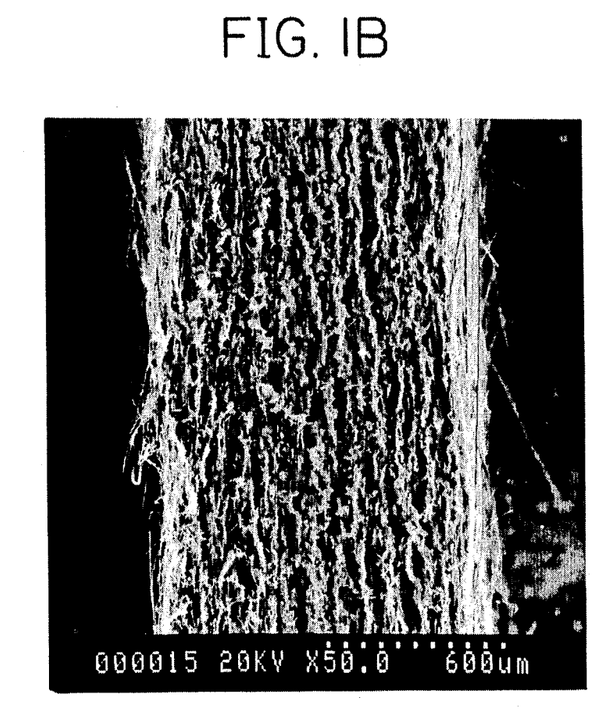
FIG. 1B shows a cross-section of the inorganic fiber sheet used as a substrate of the catalyst in FIG. 1A.

FIG. 1A shows the cross-section of a sheet of silicaalumina ceramic fibers impregnated with a catalyst component slurry, followed by drying and calcination, the ratio of $SiO_2$ to $Al_2O_3$ being 0.5 weight/weight. There is seen a number of clearances of several $\mu$ to several tens $\mu$ present therein. Further, FIG. 1B shows the cross-section of the sheet before impregnation with the catalyst component slurry. As apparent from this figure, in the case of the catalyst of the present invention (FIG. 1A), the clearances between ceramic fibers are sufficiently filled with a dense catalyst component layer. In such a state, the molded catalyst has a very high strength and cracks having an influence upon the catalyst strength hardly occur; hence a large-sized catalyst can be easily molded, and the molded catalyst is suitably used as an integrated catalyst or a catalyst assembly.

As an inorganic fiber sheet in the present invention, paper, mat, cloth, etc. made from mineral fibers such as silica-alumina fibers, silica fibers, glass fibers, etc. are exemplified. In order to impregnate the sheet with the catalyst component slurry and obtain a sufficient strength of the catalyst, the thickness of the sheet is chosen so as to be 0.25mm or more, preferably 0.5mm of more. On the other hand, in order to impregnate the sheet with the slurry sufficiently in the depth thereof, the thickness is preferred to be chosen so as to be 2.5mm or less.

Further, in the case where the catalyst is used for treating exhaust gases containing sulfur oxides such as heavy oil exhaust gas, etc., a mineral fiber sheet having a high ratio of $SiO_2/Al_2O_3$ affords better results.

Impregnation with the catalyst component slurry may be carried out according to the following process:

To a metatitanic acid slurry is added at least one of ammonium molybdate, ammonium paratungstate and ammonium metavanadate, kneading these on heating, drying the resulting paste, followed by calcination at 500° to 650° C., preferably 520° to 600° C. The calcinated material is then crushed by means of a mill so that powder of $20\mu$ or less may occupy 90% or more of the total powder, adding water to the resulting powder to prepare a slurry containing about 45 to 65% by weight of a catalyst component, and immersing an inorganic fiber sheet in the slurry to fill the clearances between fibers in the sheet with the catalyst component slurry. This operation may be carried out by any conventional impregnation technique. Vacuum degassing, intermittent compression operation, etc. are preferred to be employed in the impregnation so that air contained in the sheet may be easily removed.

Figure 2:
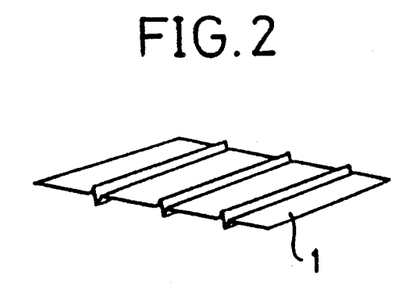
FIG. 2 shows an oblique view of a molded catalyst an example of the present invention.
Figure 4:
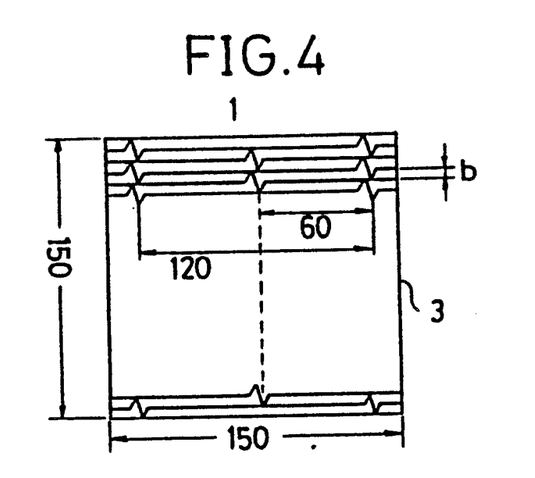
FIG. 4 shows a cross-section of a catalyst unit obtained by piling a molded-sheet form catalyst in a plural number, on one another, and containing them in a flame.

The sheet impregnated with the catalyst component is then placed between molds having a definite shape, followed by air drying or heat drying to obtain a catalyst molded body having a definite shape. As to the molds, porous molds such as punching metal, lath sheet metal, ceramic foam, etc. are advantageous in the aspect of drying. As to the catalyst shape, any of a flat form, a corrugated form, a form having projections and depressions, etc. may be employed, but a form corrugated upwards and downwards in inclined Z-form at a predetermined pitch as shown in FIG. 2 is preferred, because a catalyst assembly having many molded sheets piled as shown in FIG. 4 can be easily obtained. Such catalyst assembly is suitable for treating dust-containing exhaust gases due to a low pressure loss. Thus obtained catalyst is finally calcined at 300° to 600° C. and practically used.

In order to obtain a large-sized catalyst, a high strength of the catalyst is required. Such a requirement is realized by embedding the clearances between fibers in the sheet with a dense layer of the catalyst components. Namely, when the clearances between fibers entangled each other are filled with dense catalyst components, it is possible to obtain a catalyst molded body having a high strength and a definite elasticity, as in the case of fiber-reinforced plastics; thus it is possible to be free from the problem of brittleness raised in the case of honeycombform catalysts prepared according to conventional extrusion-molding process.

For preparing such a fiber-reinforced catalyst body, it is indispensable to fill the clearances between fibers with catalyst components as much as possible. According to the present inventors' research, it has been found that the ratio by weight of catalyst to fibers and the apparent density of the catalyst composition is important as indexes of reinforcement of the catalyst body. Namely, in order to reinforce the catalyst body up to a practically sufficient strength, it is necessary to make the ratio by weight of catalyst (metal oxides) to fibers three or higher, and also make the apparent density of the catalyst composition 0.8g/cc or higher. In the case where the catalyst components layer having filled the clearances between fibers is porous and the apparent density of the catalyst composition is less than 0.8g/cc, it is difficult to obtain a sufficient strength. Further, in the case where the ratio of catalyst components/fibers is less than 3, the effect of fixing the fibers by the catalyst components is so little that it is difficult to obtain a high strength.

The catalyst of the present invention realizing the above-mentioned specified features can be obtained as follows. The catalyst components kneaded in advance are subjected to preliminary calcining at a high temperature of 500° to 650° C., the calcined material is crushed or ground so that powder having a particle diameter of $20\mu$ or less occupies 90% by weight or more of the total powder, a slurry of a high concentration of 45 to 65% by weight is prepared from the above powder, and an inorganic fiber sheet is immersed in the slurry. By the preliminary calcination at a high temperature, the raw material of the catalyst is converted into oxides; thus a dense material having a small change in volume after the immersion is easily obtained. Further, titanium oxide or metatitanic acid generally prepared by a sulfuric acid method and used as a raw material contains a large quantity of $SO_4$ ion. When this $SO_4$ ion is present, agglomeration of particles in the slurry occurs to inhibit impregnation of inorganic fibers with a catalyst component slurry. The high temperature preliminary calcination vaporizes the $SO_4$ ion to provide a raw material from which a slurry having a low viscosity and a good impregnating property is prepared. This function is notable particularly when a molybdenum compound is contained in the catalyst component. As an index for the optimum temperature of the preliminary calcination, it is possible to employ the quantity of $SO_4$ in the catalyst, and the value is preferred to be 1.5% by weight or less.

Further, as to the crushing or milling process, either of dry process or wet process may be employed, but if coarse particles are contained in a large quantity, such particles are deposited on the surface of the sheet. As a results, the sheet cannot be impregnated with the slurry sufficiently in the depth of the sheet. The clearances between fibers in the inorganic fiber sheet fall within a range of several $\mu$ to several ten $\mu$: In order to fill the clearances completely with the particles of catalyst composition, the particles are preferred to be finer to form an extremely dense catalyst body. Thus it is necessary to crush or grind the above preliminarily calcined material so that powder of $20\mu$ or less occupies 90% by weight or more, preferably 98% by weight or more of the total powder.

However, in the case where particles of $0.5\mu$ or less are present in a large quantity, agglomeration occurs to make the impregnation operation impossible. Thus most preferably, the particle size of the powder is adjusted so that particles of $0.5\mu$ or less, particles of $1\mu$ or less, particles of $5\mu$ or less and particles of $10\mu$ or less can fall within the ranges of 50 to 80%, 70 to 85%, 90 to 95% and 92 to 100%, respectively.

As a means for milling the calcined material into fine powder, hammer mill, ball mill, vibration mill, roll crusher, etc. are exemplified. Inorganic fibers reinforce the dense catalyst component layers, in the sheet and the strength of the resulting catalyst body becomes higher with a leap than those of a product obtained by coating, in advance, the surface of an inorganic fiber sheet with a mere uncalcined catalyst component or a product obtained by impregnating the sheet surface with a catalyst component solution.

Further, the higher the slurry concentration, the denser the resulting catalyst, but since the viscosity increases in proportion to the concentration, it is preferred to use a slurry having a concentration of 45 to 65% by weight, more preferably 50 to 60% by weight. In addition, at the time of adding water to the catalyst components to prepare a slurry having a concentration of 45 to 65% by weight, if an inorganic or organic dispersing agent is added to reduce the slurry viscosity, good results can be obtained.

In order to obtain a catalyst assembly having an integrated structure, the above-mentioned inorganic fiber sheet is immersed in a catalyst component slurry, subjected to vacuum degassing or processing through press rolls to fill the clearances between fibers with the slurry, placed between molds made of porous sheet and dried at 100° to 180° C. to obtain a molded catalyst body having various shapes as shown in FIGS. 8(a) to 8(f). At that time, if a plastic mesh of polyester, polytetrafluoroethylene, polyamide or the like of several hundreds meshes is placed between the molds and the sheet, it is possible to prevent adhesion of the sheet onto the molds from occuring. The resulting molded material is finally calcined.

Figure 5:
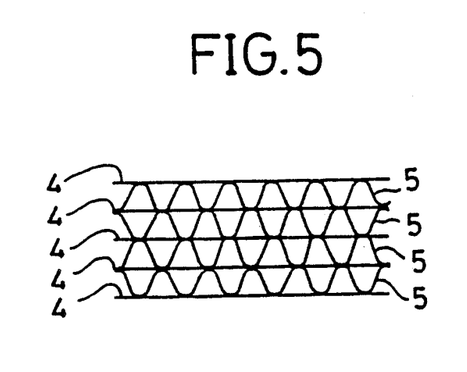
FIG. 5 shows a cross-section of a catalyst assembly having an integrated structure of the catalyst of the present invention.

On the other hand, a falt sheet of inorganic fiber is impregnated with a catalyst slurry prepared in the same manner as the above. The resulting flat sheet and the above-mentioned molded sheet are piled alternately as shown in FIG. 5. The piled sheets, if necessary, are pressed in the direction of piling to make the adhesion more complete The integrated catalyst, if necessary, is reinforced by wrapping the catalyst body along its outer periphery with the same slurry-impregnated sheet as the above-mentioned. The resulting material is dried by air or the like, followed by calcination at a definite temperature to obtain a catalyst assembly.

A combination of the inorganic fiber sheet and an inorganic fiber cloth as a substrate of the catalyst in the present invention affords a catalyst body superior in tensile and flexural strengths and displacement property.

In this case, the inorganic fiber sheet is preferably obtained by dispersing inorganic fibers in water, adhering together the fibers by the surface tension of water, dehydrating the resulting material and having the fibers mixed with each other.

On the other hand, the inorganic fiber cloth in the present invention can be obtained by bundling threads having a diameter of 5 to 20μm with a bundling agent such as starch, plastics, etc. into a bundle of 200 to 800 threads, twisting the resulting bundles into about 5 to 10 bundles and crossing the bundles in the longitudinal and lateral directions, for example. Thus, the resulting cloth consisting of yarns obtained by twisting a large number of inorganic fibers has a very high strength and a superior heat resistance on account of inorganic substance. In the structure of the catalyst of the present invention, the particles of the catalyst component are entangled with the fibers of the cloth and the other fibers contained in the catalyst body, and fill the clearances between the fibers to form a very dense and firm catalyst body. As a result, not only the strength of the inorganic fiber cloth, but also the strength brought by the composite reinforcement due to the catalyst particles and inorganic fibers contributes to the strength of the catalyst; hence the catalyst strength is higher with a leap than that of the catalyst obtained by coating a catalyst component onto the surface of a ceramic sheet, etc., or that of a catalyst obtained by merely impregnating a ceramic sheet with a catalyst component solution. In particular, the cloth is superior in the stretchability and elasticity, therefore the strength in the flexural direction is notably improved.

Figure 12A:
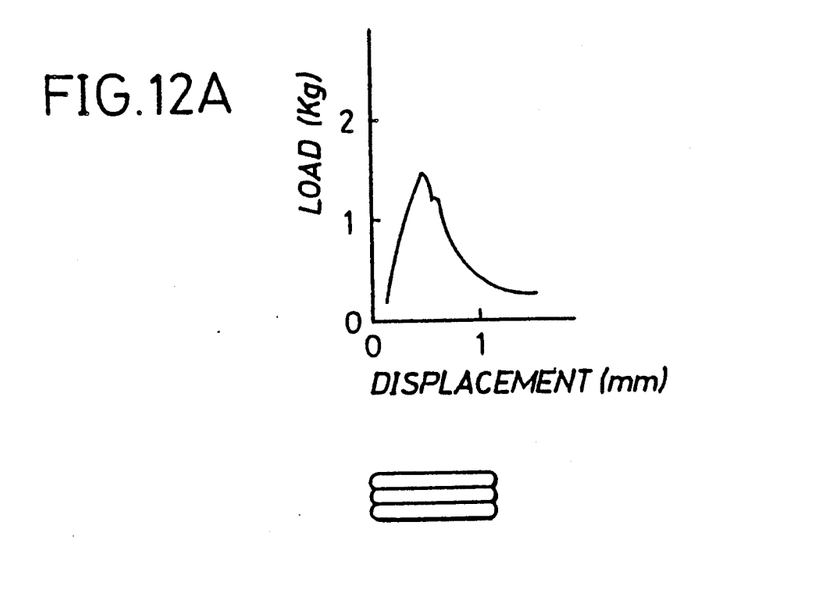
FIG. 12A and 12B show a comparison view of the flexural test results of catalysts of the present invention.
Figure 12B:
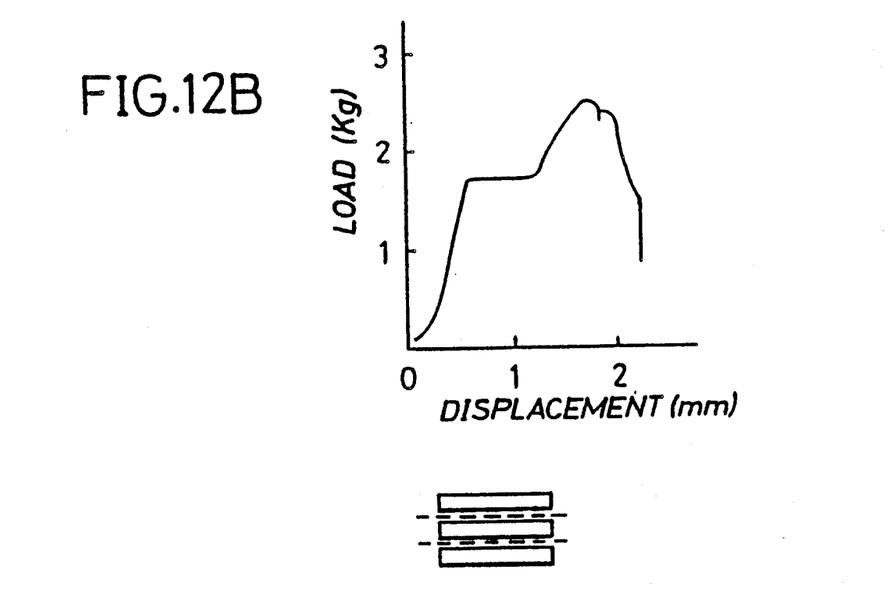

FIG. 12A shows the load displacement curve of a catalyst consisting of three layers of an inorganic fiber sheet impregnated with the catalyst components, and FIG. 12B shows the load displacement curve of a catalyst consisting of three layers of an inorganic fiber sheet impregnated with catalyst components, but two inorganic fiber cloths are placed between the sheets, respectively, as shown in the figure. As apparent from the figures, a composite catalyst having a cloth-containing structure (FIG. 12B) has a higher flexibility than that containing no cloth (FIG. 12A). Further, the specific feature of the composite catalyst of FIG. 12B consists in that a region wherein only a displacement is exhibited under a certain load, this fact indicates that the composite structure in the catalyst is very tough in the flexural direction, and seeing from the quantity of the load changed, it is considered that an elastic structure having a high strength is formed.

Further, when the above composite catalyst is subjected to rolling treatment by means of roll press or compression press or again impregnated with the catalyst slurry, the density of the catalyst body is raised to form a dense structure; hence it is possible to more improve the strength.

In addition, taking into consideration the wetting property of the catalyst particles onto the surface of the inorganic fiber cloth, it is also possible to apply a surface treatment for improving the wetting property of the cloth.

The present invention will be described in more detail by way of Examples. but it should not be construed to be limited thereto.

Example 1

To a matatitanic acid slurry (60kg) prepared according to sulfuric acid method and containing 30% by weight of titanium oxide ($TiO_2$) were added ammonium metavanadate ($NH_4VO_3$)(0.62kg) and ammonium molybdate (($NH_4)_6Mo_7O_{24}\cdot 4H_2O$) (4.51kg), and kneaded by means of a kneader at 140° C. while vaporizing water. The resulting paste the water content of which was 38% by weight was molded by means of an extrusion-granulator into granules of 3mm in diameter. Thus obtained granules were dried by a fluidized bed dryer, calcined at 560° C. for 2 hours while passing air, and milled by means of a hammer mill so that powder of 20μ or less might occupy 90% by weight or more of the total powder to obtain fine powder of catalyst.

Figure 3:
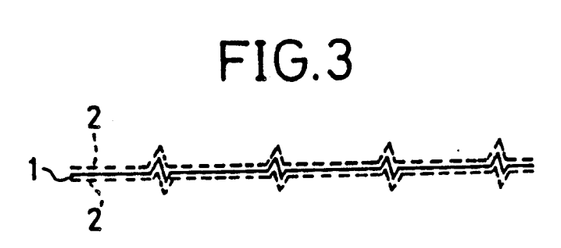
FIG. 3 shows an explanatory view of a catalyst-molding process wherein an impregnated sheet is placed between molds.

Water (4kg) was added to the above catalyst powder (5kg), followed by agitation for 10 minutes by means of a screw type agitator to obtain a slurry having a concentration of the powder of 55% by weight. Inorganic fiber sheet obtained by cutting a ceramic paper (Paper-LS, trade name of Isolite Co., Ltd.; thickness 1 mm and basis weight 120g/m²) into 500 mm square, was immersed in the slurry, degassed by pressing by means of rubber rolls to impregnate the sheet with the slurry. After scraping off surplus slurry from the surface of the sheet impregnated with the slurry, the resulting sheet was placed between two porous molds obtained by processing a metal lath of SUS 304. This metal lath was obtained by applying a number of zig-zag slits onto a thin metal sheet and extending in the direction perpendicular to the slit. FIG. 3 shows a cross-sectional view of the inorganic fiber sheet, placed between two porous molds 2. The sheet has angle sections in a Z-form in equal pitches. The sheet between the molds was dried at 180° C. for one hour. After removing the molds, the molded sheet was calcined in air at 550° C. for 2 hours to obtain a molded catalyst of the present invention.

Examples 2-4

Example 1 was repeated except that the slurry concentration of 55% by weight was varied to 45, 50 and 60% by weight, to prepare catalysts.

Examples 5-8

Examples 1-4 were repeated except that the inorganic fibers used in the above Examples were changed to HMC-100 (a ceramic sheet made by Nippon Muki K.K., $SiO_2/Al_2O_3$ 0.5; thickness 1 mm and basis weight 200g/m$^2$), to prepare catalysts.

Comparative examples 1-4

Examples 1-4 were repeated except that degassing operation by means of rubber rolls at the time of impregnation with the catalyst slurry was omitted and the sheets were immersed in the slurry and just thereafter the sheets were dried, to prepare catalysts.

Comparative examples 5 and 6

Example 5 was repeated except that the slurry concentration was varied to 35 and 40% by weight, respectively, to prepare catalysts.

With the respective molded catalysts prepared in Examples 1-8 and Comparative examples 1-6 and the respective sheets used therefor, the thicknesses and the weights of 10 cm square were measured, and the ratio by weight of the catalyst composition/inorganic fibers and the apparent density were calculated according to the following equations:

Catalyst composition/inorganic fibers (g/g) =

$$\frac{\text{catalyst weight(g)} - \text{inorganic fibers weight(g)}}{\text{inorganic fibers weight(g)}}$$

Apparent density (g/cm$^3$) =

$$\frac{\text{catalyst weight(g)}}{\text{molded catalyst thickness(cm)} \times 100(\text{cm}^2)}$$

Further, the molded catalysts were cut into a size of 15 mm wide and 50 mm long, and their tensile break strengths were sought by means of a precision tensile tester.

The results are collectively shown in Table 1. As apparent from the table, the catalysts of Examples of the present invention having a ratio of catalyst composition/ inorganic fibers of 3.0 or more and an apparent density of 0.8 or more have a higher strength than those of Comparative examples.

The cross-section of the molded catalyst of Example 1 and that of the inorganic fiber sheet as a substrate thereof as viewed by an electronic microscope are shown in FIG. 1A and FIG. 1B, respectively. These figures indicate that according to the process of the present invention, a dense catalyst component fills the clearances between inorganic fibers to realize a high strength catalyst body.

TABLE 1

| Catalyst | Amount of catalyst composition supported (g/m$^2$) | Catalyst composition/ inorganic fibers (g/g) | Apparent density (g/cm$^3$) | Tensile strength (kg) |
|---|---|---|---|---|
| Example 1 | 850 | 7.1 | 1.08 | 7.3 |
| 2 | 640 | 5.3 | 0.84 | 5.3 |
| 3 | 750 | 6.3 | 0.97 | 6.5 |
| 4 | 960 | 8.0 | 1.20 | 9.5 |
| 5 | 760 | 3.8 | 1.07 | 8.2 |
| 6 | 520 | 3.2 | 0.80 | 6.8 |
| 7 | 680 | 3.4 | 0.97 | 7.4 |
| 8 | 850 | 4.3 | 1.18 | 10.6 |
| 9 | 740 | 6.2 | 0.96 | 9.0 |
| Comp. ex. 1 | 750 | 6.3 | 0.75 | 2.2 |
| 2 | 520 | 4.3 | 0.71 | 3.0 |
| 3 | 680 | 5.6 | 0.73 | 2.5 |
| 4 | 830 | 6.9 | 0.68 | 3.1 |
| 5 | 420 | 2.1 | 0.89 | 1.8 |
| 6 | 490 | 2.5 | 0.86 | 2.0 |
| 7 | 630 | 5.3 | 0.63 | 1.8 |

Example 9

Example 1 was repeated except that ammonium molybdate was replaced by ammonium paratungstate (($NH_4)_{10}H_{10}W_{12}O_{46}$ 6$H_2O$)(6.91g), to obtain a catalyst.

Comparative example 7

Comparative example 1 was repeated except that ammonium molybdate was replaced by ammonium paratungstate (6.91g) to obtain a catalyst.

With the catalysts of Example 9 and Comparative example 7, the same tests as in Example 1 were carried out. The results are also shown in Table 1.

Example 10

The molded catalyst obtained in Example 1 was cut into a size of 150 mm wide and 300 long. The resulting catalysts were piled in a mild steel frame 3 (150 mm × 150 mm × 300 mm) as shown in FIG. 4 to form a catalyst unit. Pitch of the angle section of Z-form provided along the catalyst was 120 mm. With the catalyst units, its denitration property and permeation pressure loss were measured under the following conditions:

Kind of exhaust gas: exhaust gas of A heavy oil combustion
$NH_3/NO_x$: 1.0mol/mol
Gas amount: 50Nm$^3$/h
LV: 1.4m/s
Temperature: 350° C.
The following superior results were obtained:
Percentage denitration: 98% or more
Percentage pressure loss: about 2mm$H_2O$/m.

Next, the catalyst assembly of the present invention will be described by way of concrete Examples.

Example 11

To a metatitanic acid slurry (60kg) prepared according to sulfuric acid method and containing 30% by weight of titanium oxide ($TiO_2$) were added ammonium metavanadate ($NH_4VO_3$)(0.62 kg) and ammonium molybdate (($NH_4)_6Mo_7O_{24}\cdot 4H_2O$) (4.51 kg), and kneaded by means of a kneader at 140° C. while vaporizing water. The resulting paste the water content of which was 38% by weight was molded by means of an extrusion-granulator into granules of 3 mm in diameter. Thus obtained granules were dried by a fluidized bed dryer, calcined at 560° C. for 2 hours while passing air, and milled by means of a hammer mill to obtain fine powder of catalyst.

Water (8kg) was added to the above catalyst powder (10kg), followed by agitation for 10 minutes by means of an agitator to obtain a slurry having a viscosity of 15 cps. Inorganic fiber sheet obtained by cutting a ceramic paper made by Isolite Co., Ltd. (thickness 1mm and basis weight 120g/m$^2$) into a size of 500mm square was immersed in this slurry. The sheet was then placed between polyester gauzes of 90 meshes, impregnated with the catalyst slurry while degassing by pressing by means of rubber rolls. The sheet held between the polyester gauzes was further placed between porous molds of SUS 304 lath sheet in a corrugated form having a pitch of 20mm and a crest of 10mm, and dried and molded at 180° C. for 2 hours. The surface of the fiber sheet was not adhered to the molds. After removing the molds and the gauzes, the molded sheet was calcined at 50° C. for 2 hours to obtain a molded catalyst.

Separately, an inorganic fiber sheet obtained by cutting the ceramic paper was impregnated with a catalyst slurry in the same manner as above. This sheet and the above-mentioned molded catalyst were alternately piled so that the respective numbers of the sheet and the molded catalyst were forty. The piled materials were applied a load of 10kg through a plywood put thereon, and dried in the atmosphere. The resulting integrated catalyst was subjected to heat treatment at 500° C. for 2 hours to obtain a catalyst assembly having an integrated structure as shown in FIG. 5.

Example 12

Figure 9:
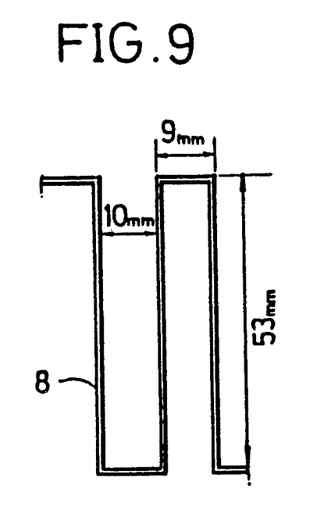
FIG. 9 shows a cross-section of a mold employed in the example of the present invention.
Figure 10:
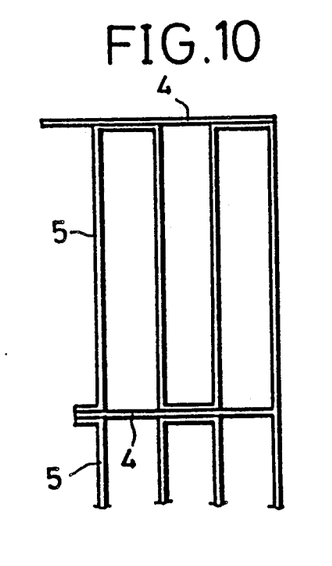
FIG. 10 shows a cross-section of an integrated catalyst structure in the example of the present invention.

Using molds having a form shown in FIG. 9 in place of the molds of Example 11, a catalyst was molded. The obtained catalysts were piled with a flat sheet catalyst in 9 layers in the same manner as above, to obtain a catalyst assembly as shown in FIG. 10.

Comparative example 8 and 9

Examples 11 and 12 were repeated except that the flat sheet impregnated with the slurry in the Examples was replaced by a flat sheet obtained by further drying and calcining the above-mentioned sheet, the crest parts of the respective molded catalysts were applied a silica sol as an adhesive, and this molded catalyst and the above flat sheet were piled alternately, to obtain catalysts.

In comparison of Examples 11 and 12 with Comparative examples 8 and 9, the resulting materials of the Examples had a sufficient strength for the integrated structure and were not separated at their jointed parts at the time of operations such as transportation, etc. Further, the respective crest parts were completely jointed to the flat sheet.

Whereas, in the case of the catalysts of Comparative examples, a number of parts 10 where the crest parts were not contacted with the flat sheet 7 were present due to the stiffness of the flat sheet, as shown in FIG. 7, and the strength of the jointed parts was also low. Thus, the crest parts were liable to be separated from the flat sheet by the shock at the time of transportation, and the catalyst assembly was liable to be broken. Particularly, the catalyst assembly of Comparative example 9 (FIG. 10) was weak against the external force in the lateral direction, and when it was held up, it caused deformation and separation at many jointed parts.

Example 13

Figure 11:
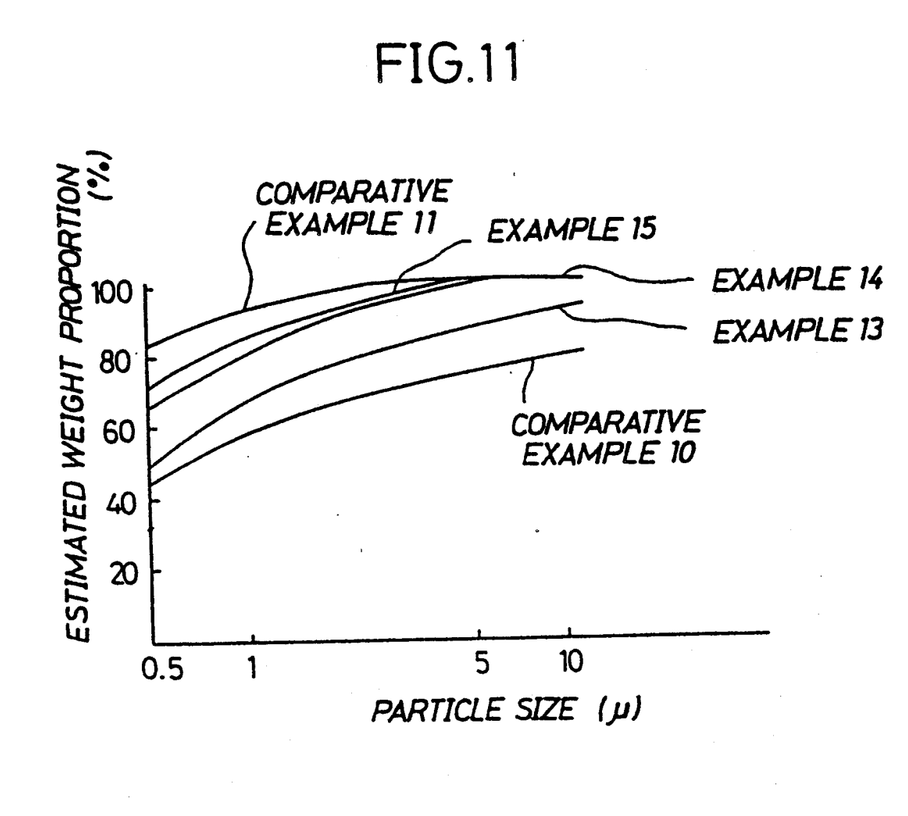
FIG. 11 shows the relationship between particle size and estimated weight proportion of the catalyst particles to be impregnated in the inorganic fiber sheet in the examples of the present invention.

Calcined granules of catalyst composition obtained in the same manner as Example 1, were milled by means of a ball mill to obtain a fine catalyst powder, the particle size distribution of which was shown in FIG. 11.

Water (4kg) was added to the above catalyst powder (5kg), followed by agitation for 10 minutes by means of a screw type agitator to obtain a slurry having a concentration of the powder of 55% by weight. Inorganic fiber sheet obtained by cutting a ceramic paper (Paper-LS, trade name of Isolite Co., Ltd.; thickness 1 mm and fiber weight 120g/m$^2$) into 500 mm square, was immersed in the slurry, degassed by pressing by means of rubber rolls to impregnate the sheet with the slurry. After scraping off surplus slurry from the surface of the sheet, the resulting sheet was dried at 180° C, and calcined in air at 550° C. for 2 hours to obtain a catalyst.

Comparative example 10

Example 13 was repeated except that milling was carried out by means of a ball mill of Example 13, but in such a period that a large proportion of coarse particles was left in the resulting powder. The particle size distribution of the powder is shown in FIG. 11.

Example 14

Example 13 was repeated except that the granules of catalyst composition was crushed under pressure by means of a roll crusher, in place of using the ball mill, to obtain a catalyst powder which particle size distribution was shown in FIG. 11.

Example 15

Example 14 was repeated except that a calcined catalyst powder of metal oxides a ratio of which was Ti/W/V=93/5/2 (% by atom) was used. The particle size distribution the catalyst powder is shown in FIG. 11.

Comparative example 11

Comparative example 10 was repeated except that the catalyst powder was milled by means of a ball mill for a long period to obtain a catalyst powder having a particle distribution size shown in FIG. 11.

The above particle size distribution was measured according to optical transmission method, using Micron Photokeizer SKN-100 Type (trade name, made b Seishin Kigyo Co., Ltd.). As seen from the results shown in FIG. 11, the catalyst particles used in Examples 13–15 become finer than that of Comparative example 10, and the impregnation property of the ceramic sheet with the catalyst powder is improved.

Further, the quantity of the catalyst composition supported in the sheet are shown in Table 2. As seen from the Table, the catalyst of Comparative example 11 having excessive fine particle, that is, having particles of 0.5$\mu$ or less in a large quantity has an inferior impregnation property.

Further, as seen from FIG. 11, as to the particle size distribution of particles to be impregnated in the ceramic fiber sheet, it is suitable that particles of 0.5$\mu$ or less are in the range of 50 to 80%, those of 1$\mu$ or less are in the range of 70 to 85%, those of 5$\mu$ or less are in the range of 90 to 95% and those of 10$\mu$ or less are in the range of 92 to 100%.

TABLE 2

| Catalyst | Amount of catalyst supported (g/m$^2$) | Tensile strength (kg) |
| --- | --- | --- |
| Example 13 | 780 | 5.1 |
| 14 | 860 | 7.1 |
| 15 | 850 | 10.5 |
| Comp. ex. 10 | 710 | 2.9 |
| 11 | 760 | 4.5 |

Further, the catalyst sheet was cut into a size of mm wide and 50mm long to obtain its tensile strength by means of a precision tensile tester. The values are together shown in Table 1. As seen from the table, as the quantity of catalyst supported increases, the strength of the catalyst sheet also increases.

The following examples shows use of a composite sheet of an inorganic fiber sheet and an inorganic fiber cloth as a substrate of catalyst component.

Example 16

Calcined granules of catalyst composition obtained in the same manner as Example 13, were milled by means of a ball mill to obtain a fine catalyst powder.

Water (4kg) was added to the above catalyst powder (5kg), followed by agitating by means of a screw type agitator for 10 minutes to obtain a slurry having a concentration of 55% by weight.

Figure 13:
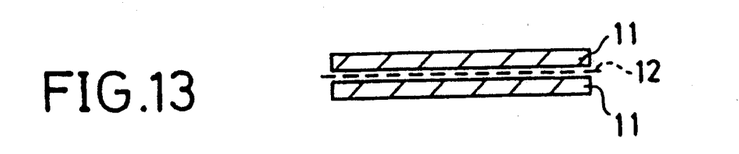
FIGS. 13–19 show explanatory view of the catalyst structures in Examples of the present invention.

Sheets obtained by cutting a ceramic fiber sheet (Sheet made by Isolite Co., Ltd.; nominal thickness 0.5mm and basis weight of 60g/m$^2$) having a ratio by weight of SiO$_2$/Al$_2$O$_3$ of about 1.0, into 500mm square, were immersed in the above-mentioned slurry to impregnate the sheets with the catalyst slurry. A mineral fiber cloth 12 (E glass, basis weight 130g/m$^2$, EGW1-10AH made by Central Glass Co., Ltd.), was placed between two of the impregnated sheets 11 as shown in FIG. 13, and rolled by means of a roll press. The rolled material was then placed between porous molds obtained by processing a SUS metal lath as shown in FIG. 3, dried at 180° C. for one hour, removed the molds and calcined in air at 550° C. for 2 hours to obtain a molded catalyst as shown in FIG. 2.

The components of E glass fiber are shown in Table 3.

TABLE 3

| Component | Weight (%) |
| --- | --- |
| SiO$_2$ | 52–56 |
| Al$_2$O$_3$ | 12–16 |
| CaO | 16–25 |
| MgO | 0–6 |
| B$_2$O$_3$ | 8–13 |
| R$_2$O | 0–3 |
| TiO$_2$ | 0–0.4 |
| Fe$_2$O$_3$ | 0.05–0.4 |
| F | 0–0.5 |

The above E glass fiber cloth has a good water-resistance and insulation quality and also a specific feature of being hardly changed with years.

Examples 17 and 18

Example 16 was repeated except that the inorganic fiber cloth was replaced by E glass fiber cloth having 8 yarns per inch both in the longitudinal and lateral directions, made by Mie Fabric Co., Ltd. and C glass fiber cloth having 10 yarns per inch both in the longitudinal directions, made by Mie Fabric Co., Ltd., to prepare molded catalysts. The above C glass fiber cloth has a good acid-resistance. Its components are shown in Table 4.

TABLE 4

| Component | Weight (%) |
| --- | --- |
| SiO$_2$ | 65.0 |
| CaO | 14.0 |
| MgO | 3.0 |
| Na$_2$O | 8.0 |
| B$_2$O$_3$ | 6.0 |
| Al$_2$O$_3$ | 4.0 |

Example 19

Figure 14:
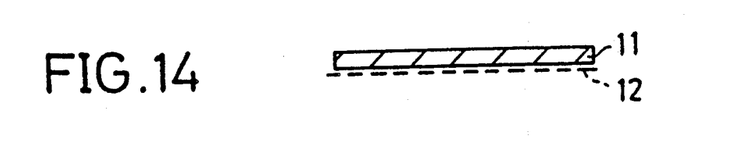

Example 16 was repeated except that one catalyst-impregnated sheet in Example 16 was coated with a catalyst paste containing 55% by weight of the catalyst component and 15% by weight of Kaowool (trademark of KAO Co., Ltd., a mineral fiber composed mainly of SiO$_2$ and Al$_2$O$_3$), adhered thereon an inorganic fiber cloth, followed by rolling by means of a roll press, to obtain a catalyst. A cross-sectional view of the catalyst in shown in FIG. 14.

Example 20

Figure 15:
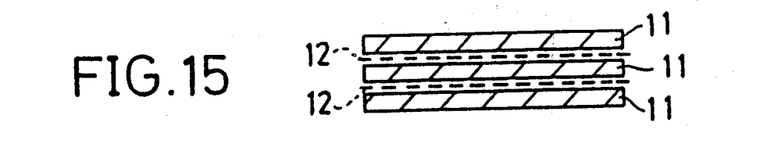

Example 16 was repeated except that three of the in Example 16 and catalyst-impregnated sheets obtained two of the inorganic fiber cloth in Example 16 were used and the respective one of the two inorganic fiber cloths was placed between two of the catalyst-impregnated sheet respectively, to prepare a catalyst. A cross-sectional view of the catalyst is shown in FIG. 15.

Example 21

Figure 16:
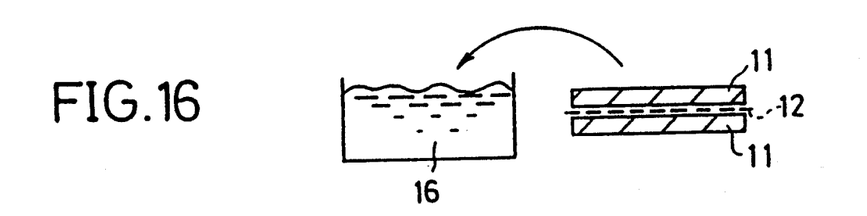

The catalyst of Example 16 was placed between porous molds, followed by drying (before calcination), again impregnating the resulting material with a catalyst slurry having a concentration of 50% by weight as shown in FIG. 16, drying and calcining in air at 550° C. for 2 hours, to obtain a catalyst. In FIG. 16, numeral 16 represents a catalyst slurry.

Examples 22 and 23

Figure 17:
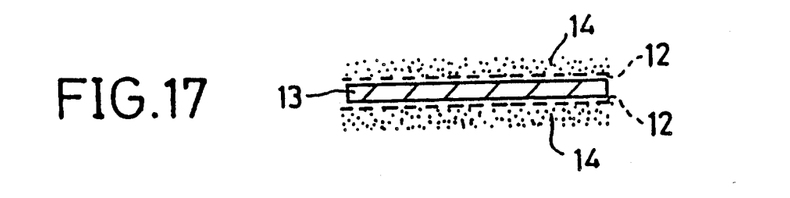

Example 16 was repeated except that one of the catalyst-impregnated sheets 13 of Example 16, was placed between two of the inorganic fiber cloth 12, as shown in FIG. 17, which was then coated with a catalyst paste 14 containing 55% by weight of the catalyst component and 15% by weight of Kaowool (trademark of KAO Co., Ltd., a mineral fiber composed mainly of SiO$_2$ and Al$_2$O$_3$), and rolled by means of a roll press (Example 22). The above procedure was repeated except that the fiber directions of the cloth were shifted to each other (Example 23)

Example 24

Figure 18:
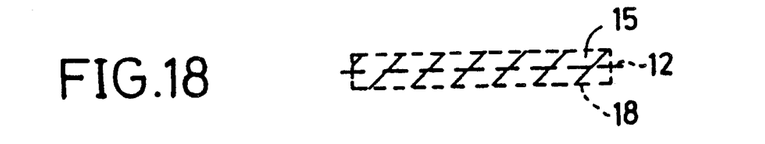

Kaowool (800g) degreased at 700° C. was agitated by a rotor in water (40l) at 10,000rpm for 5 minutes to cut and disperse the fiber, followed by adding water (60l) for dilution, making an inorganic fiber sheet on a metal gauze of 32 meshes. This sheet 12 was placed between polyester fiber meshes 18 of 90 meshes, as shown in FIG. 18, to squeeze water, dried at 180° C. for one hour, impregnated with the catalyst slurry, and subjected to operations in the same manner as Example 16, to prepare a catalyst.

Examples 25 and 26

Figure 19:
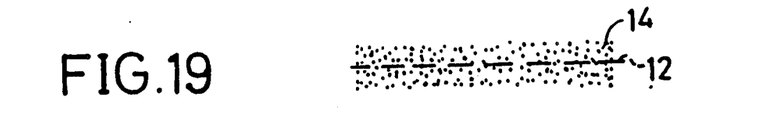

Kaowool (1.5kg) was added to a catalyst powder (5.5kg) prepared in the same manner as in Example 16, a catalyst paste was prepared. This catalyst paste 14 was coated 14 onto one side (Example 25) or both sides (Example 26) of an inorganic fiber cloth 12 as shown in FIG. 19. The coated cloth was then rolled by means of rolls, and subjected to operations in the same manner as Example 16, to prepare a catalyst.

Example 27

A sheet (Sheet LS made by Isolite Co., Ltd.; nominal thickness 1.0 mm and basis weight 120g/m$^2$) was impregnated with the catalyst slurry in Example 16, followed by placing the resulting material between porous molds, drying at 180° C. for one hour, removing the molds, and calcining in air at 550° C. for 2 hours, to obtain a catalyst.

Example 28

The catalyst paste in Example 17 was coated onto the inorganic fiber sheet. The coated sheet was then placed between porous molds, dried at 180° C. for one hour, removed the molds and calcined in air at 550° C. for 2 hours, to obtain a catalyst.

Examples 29 and 30

The catalyst-impregnated sheets in Example 16 were piled into two layers (Example 29) or three layers (Example 30), rolled by means of a roll press and subjected to operations in the same manner as in Example 16, to prepare catalysts.

The results are collectively shown in Table 5. In this table, the tensile break strengths were sought with the catalyst specimens cut into a size of 15 mm wide and 80mm long by means of a precision tensile tester. Further, the flexural strengths under a load and the displaced amounts by means of a dial gauze were measured with the catalyst specimens cut into a size of 20 mm wide and 30 mm long.

TABLE 5

| Example No. | Amount of catalyst supported (g/m$^2$) | Apparent density (g/cm$^3$) | Catalyst thickness (mm) | Tensile strength (kg/cm$^2$) | Flexural strength (kg/cm$^2$) | Displaced amount (mm) |
|---|---|---|---|---|---|---|
| 16 | 1200 | 1.35 | 1.00 | 93.3 | 160.2 | 1.4 |
| 17 | 1220 | 1.36 | 0.98 | 97.4 | 165.3 | 1.5 |
| 18 | 1210 | 1.36 | 0.95 | 84.2 | 140.2 | 1.1 |
| 19 | 1050 | 1.33 | 0.95 | 82.3 | 141.3 | 1.2 |
| 20 | 1400 | 1.87 | 1.24 | 126.9 | 234.0 | 1.7 |
| 21 | 1250 | 1.44 | 1.05 | 105.6 | 172.4 | 1.4 |
| 22 | 1320 | 1.45 | 0.95 | 86.6 | 153.8 | 1.3 |
| 23 | 1300 | 1.43 | 0.95 | 82.4 | 149.6 | 1.2 |
| 24 | 1030 | 1.15 | 1.25 | 90.0 | 158.6 | 1.2 |
| 25 | 1150 | 1.30 | 0.90 | 74.2 | 151.5 | 0.6 |
| 26 | 1350 | 1.55 | 1.15 | 80.3 | 160.9 | 0.7 |
| 27 | 910 | 1.15 | 0.95 | 19.3 | 77.2 | 0.2 |
| 28 | 640 | 0.89 | 1.25 | 16.7 | 63.8 | 0.1 |
| 29 | 1150 | 1.30 | 0.85 | 68.9 | 114.5 | 0.4 |
| 30 | 1420 | 1.38 | 1.05 | 72.5 | 147.3 | 0.5 |

As apparent from the above results, the catalysts of Example 16-26 have almost the same apparent densities as those of the catalysts of examples 27-30, and nevertheless they are superior in both of the tensile strength and flexural strength. This fact indicates that the catalysts form a firm texture by a composite reinforcement brought by catalyst particles and inorganic fibers, in addition to the stretchability and elasticity of inorganic fiber cloth, to thereby realize catalysts having a high strength.

The catalyst of the present invention has an elasticity by itself and it is possible to easily obtain a high strength denitration catalyst capable of retaining its shape by itself. Thus, by piling the catalysts as shown in FIG. 4, it is possible to form a catalyst assembly having a thin wall structure and a high strength. This catalyst assembly has a small pressure loss and hardly causing dust deposition.

Further, by varying the shape of molds of the catalyst, it is possible to prepare various shapes of catalyst such as corrugated plate type, projection and depression-plate type as shown in Japanese patent application laid-open No. Sho 63-296844, etc. and its size is also optionally varied. Thus it is possible to prepare a catalyst of a large size over 500mm square, having various path forms. Accordingly, it is possible to design an exhaust gas-treating device using a catalyst having a shape and size suitable to properties of exhaust gases.

Further, according to the catalyst assembly of the present invention, that is the integrated type catalyst for removing nitrogen oxides, it is possible to obtain a large size structure having a large cross-section area of gas flow path, a high strength and a high stiffness.

Further, according to the composite catalyst structure containing an inorganic fiber cloth, it is possible to easily obtain a high strength denitration catalyst having elasticity by itself and capable of retaining its shape by itself. Further, the catalyst is lightweight and its deterioration due to oxidation at the time of its use is few.

What we claim is:

1. A catalyst for removing nitrogen oxides comprising a catalyst composition containing titanium oxide and at least one member of oxides of vanadium, molybdenum and tungsten, and inorganic fibers, wherein the clearances of the inorganic fibers are filled with said catalyst composition; the ratio by weight of said catalyst composition to said inorganic fibers is 3 or more; and the apparent density of said catalyst is 0.8g/cm$^3$ or more.

2. A process for producing a catalyst for removing nitrogen oxides, which comprises providing a composition containing titanium oxide and at least one member of oxides of vanadium, molybdenum and tungsten, calcining said composition at 500–650° C., crushing the calcined material so that powder of 20μ or less can occupy 90% by weight or more of the crushed material, adding water to the crushed material to form a slurry, impregnating an inorganic fiber sheet with said slurry, placing the resulting sheet between porous molds, drying and molding it, and calcining the resulting molded material at 300–650° C. to obtain a molded catalyst.

3. A process for producing a catalyst for removing nitrogen oxides according to claim 2, wherein said slurry to be impregnated in the inorganic fiber sheet has a solids concentration of 45 to 65% by weight.

4. A process for producing a catalyst for removing nitrogen oxides according to claim 2, wherein said catalyst powder before adding water is adjusted to have a particle size distribution that particles of 0.5μ or less, particles of 1μ or less, particles of 5μ or less and particles of 10μ or less fall within the ranges of 50 to 80%, 70 to 85%, to 95% and 92 to 100%, respectively.

5. A process for producing a catalyst for removing nitrogen oxides according to claim 2, wherein said sheet between the porous molds before drying is impregnated again with said catalyst slurry, followed by drying, and calcining the resulting molded material at 300–650° C. to obtain a molded catalyst.

6. A process for producing a catalyst for removing nitrogen oxides according to claim 2, wherein an inorganic fiber cloth is piled on said inorganic fiber sheet impregnated with said catalyst slurry, alternately, followed by placing the resulting sheet between porous molds, drying and molding it, and calcining the resulting molded material at 300–650° C. to obtain a molded catalyst.

7. A process for producing a catalyst assembly for removing nitrogen oxides, which comprises providing a composition containing titanium oxide and at least one member of oxides of vanadium, molybdenum and tungsten, calcining said composition at 500–650° C., crushing the calcined material so that powder of 20μ or less can occupy 90% by weight or more of the crushed material, adding water to the crushed material to form a catalyst slurry, providing an inorganic fiber sheet as a substrate, impregnating said sheet with said slurry, placing said impregnated sheet between porous molds, drying and molding it, calcining the resulting molded material at 300–650° C. to obtain a molded catalyst, piling said molded catalyst and an inorganic fiber sheet impregnated with a catalyst slurry prepared in the same manner as the above, alternately, drying and calcining to form a catalyst assembly.

8. A process for producing a catalyst assembly for removing nitrogen oxides according to claim 7, wherein said inorganic fiber sheet is placed between gauzes of organic fibers, and then impregnated with said slurry.

9. A process for producing a catalyst for removing nitrogen oxides, which comprises providing a composition containing titanium oxide and at least one member of oxides of vanadium, molybdenum and tungsten, calcining said composition at 500–650° C., crushing the calcined material so that powder of 20μ or less can occupy 90% by weight or more of the crushed material, adding water and an inorganic fiber to the crushed material to form a paste, coating an inorganic fiber sheet with said paste, placing the resulting sheet between porous molds, drying and molding it, and calcining the resulting molded material at 300–650° C. to obtain a molded catalyst.

10. A process for producing a catalyst for removing nitrogen oxides according to claim 9, wherein an inorganic fiber cloth is placed on said inorganic fiber sheet and said coating is carried out on the inorganic fiber cloth.

* * * * *